United States Patent
Mermoud et al.

(10) Patent No.: US 11,805,003 B2
(45) Date of Patent: Oct. 31, 2023

(54) ANOMALY DETECTION WITH ROOT CAUSE LEARNING IN A NETWORK ASSURANCE SERVICE

(71) Applicant: Cisco Technology, Inc., San Jose, CA (US)

(72) Inventors: Grégory Mermoud, Veyras (CH); Jean-Philippe Vasseur, Saint Martin D'uriage (FR); David Tedaldi, Zurich (CH)

(73) Assignee: Cisco Technology, Inc., San Jose, CA (US)

( * ) Notice: Subject to any disclaimer, the term of this patent is extended or adjusted under 35 U.S.C. 154(b) by 598 days.

(21) Appl. No.: 15/983,615

(22) Filed: May 18, 2018

(65) Prior Publication Data

US 2019/0356553 A1    Nov. 21, 2019

(51) Int. Cl.
| | |
|---|---|
| *G06F 15/173* | (2006.01) |
| *H04L 41/0631* | (2022.01) |
| *H04L 41/142* | (2022.01) |
| *H04L 41/16* | (2022.01) |
| *H04L 43/16* | (2022.01) |
| *H04L 41/22* | (2022.01) |
| *G06F 18/241* | (2023.01) |

(52) U.S. Cl.
CPC ........ *H04L 41/0631* (2013.01); *G06F 18/241* (2023.01); *H04L 41/065* (2013.01); *H04L 41/142* (2013.01); *H04L 41/16* (2013.01); *H04L 41/22* (2013.01); *H04L 43/16* (2013.01)

(58) Field of Classification Search
CPC ..... H04L 41/142; H04L 41/065; H04L 41/16; H04L 43/16; H04L 41/22; H04L 41/147; H04L 41/5019; H04L 43/045; H04L 41/0631; G06K 9/6268; G06K 9/6282; G06K 9/6284
USPC ........................................................ 709/224
See application file for complete search history.

(56) References Cited

U.S. PATENT DOCUMENTS

| | | | |
|---|---|---|---|
| 7,954,090 B1 * | 5/2011 | Qureshi ................. | G06N 5/048 717/127 |
| 10,333,965 B2 * | 6/2019 | Gathala ............ | H04W 12/1208 |
| 2014/0122691 A1 | 5/2014 | Simhon et al. | |

(Continued)

*Primary Examiner* — Nicholas P Celani
*Assistant Examiner* — Karina J Garcia-Ching
(74) *Attorney, Agent, or Firm* — BEHMKE INNOVATION GROUP LLC; Kenneth J. Heywood; Jonathon P. Western (57) ABSTRACT

In one embodiment, a network assurance service that monitors a network detects an anomaly in the network by applying an anomaly detector to telemetry data collected from the network. The service sends first data to a user interface that causes the interface to present the detected anomaly and one or more candidate root cause metrics from the telemetry data associated with the detected anomaly. The service receives feedback regarding the candidate root cause metric(s) and learns a root cause of the anomaly as one or more thresholds of the candidate root cause metric(s), based in part on the received feedback regarding the candidate root cause metric(s). The service sends second data to the user interface that causes the user interface to present at least one of the candidate root cause metric(s) as a candidate root cause of a subsequent detected anomaly, based on the learned threshold(s).

7 Claims, 8 Drawing Sheets

(56) References Cited

U.S. PATENT DOCUMENTS

| | | | |
|---|---|---|---|
| 2015/0333998 A1* | 11/2015 | Gopalakrishnan | H04L 43/08 |
| | | | 370/244 |
| 2017/0208487 A1* | 7/2017 | Ratakonda | H04W 24/04 |
| 2017/0353991 A1* | 12/2017 | Tapia | H04L 41/147 |
| 2018/0039914 A1 | 2/2018 | Menahem et al. | |
| 2018/0060150 A1 | 3/2018 | Cunico et al. | |
| 2019/0025365 A1* | 1/2019 | Granade | G06Q 50/06 |
| 2019/0026489 A1* | 1/2019 | Nerurkar | G06F 21/6254 |
| 2019/0081969 A1* | 3/2019 | Phadke | H04L 63/1425 |

* cited by examiner

ANOMALY DETECTION WITH ROOT CAUSE LEARNING IN A NETWORK ASSURANCE SERVICE

TECHNICAL FIELD

The present disclosure relates generally to computer networks, and, more particularly, to anomaly detection with root cause learning in a network assurance service.

BACKGROUND

Networks are large-scale distributed systems governed by complex dynamics and very large number of parameters. In general, network assurance involves applying analytics to captured network information, to assess the health of the network. For example, a network assurance system may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a network assurance service that monitors a network detects an anomaly in the network by applying a machine learning-based anomaly detector to telemetry data collected from the network. The network assurance service sends first interface data to a user interface that causes the user interface to present the detected anomaly and one or more candidate root cause metrics from the telemetry data associated with the detected anomaly. The network assurance service receives feedback regarding the one or more candidate root cause metrics. The network assurance service uses a machine learning-based model to learn a root cause of the anomaly as one or more thresholds of the one or more candidate root cause metrics, based in part on the received feedback regarding the one or more candidate root cause metrics. The network assurance service sends second interface data to the user interface. The second interface data causes the user interface to present at least one of the one or more candidate root cause metrics as a candidate root cause of a subsequent detected anomaly, based on the learned one or more thresholds.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
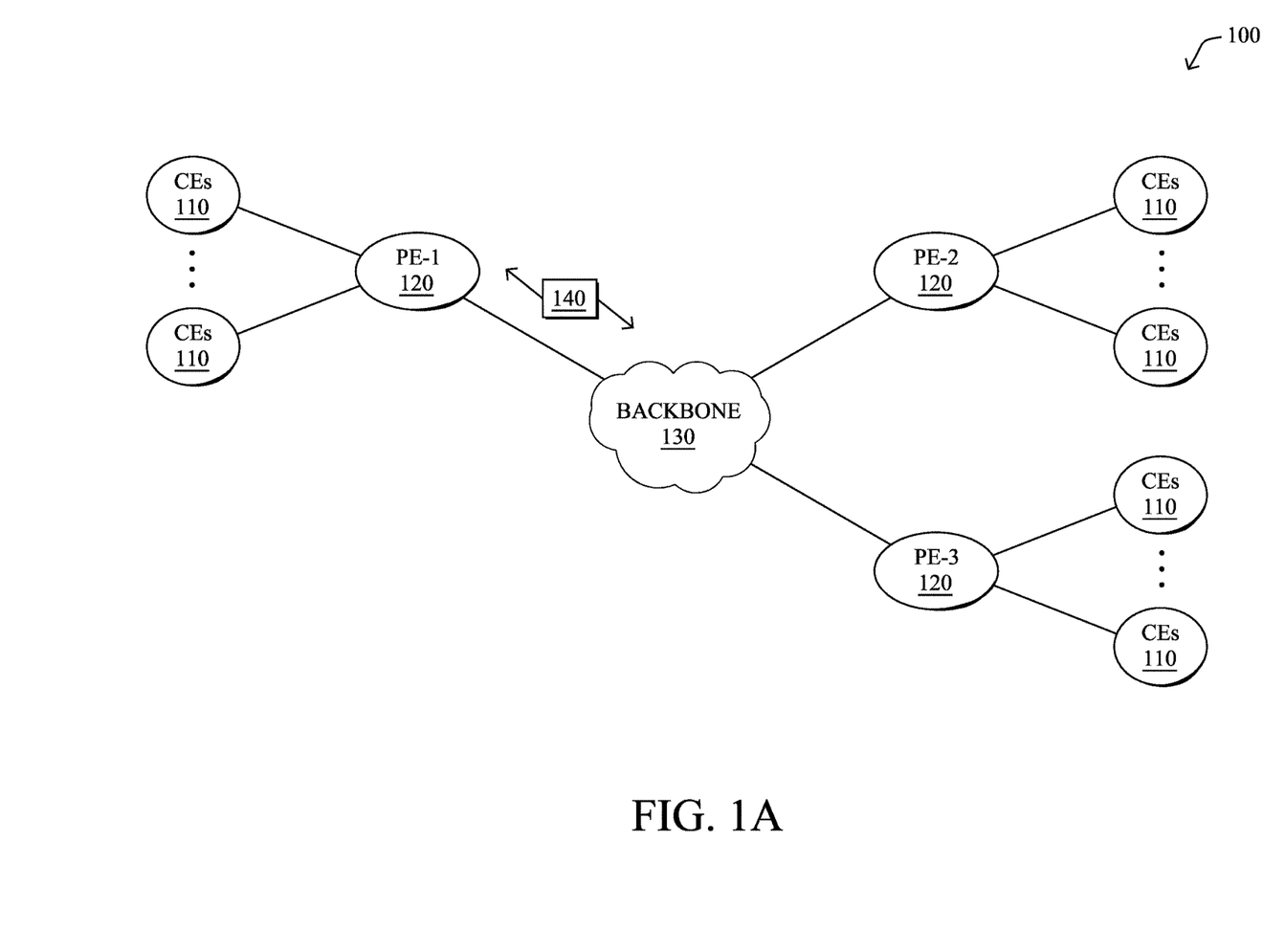
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
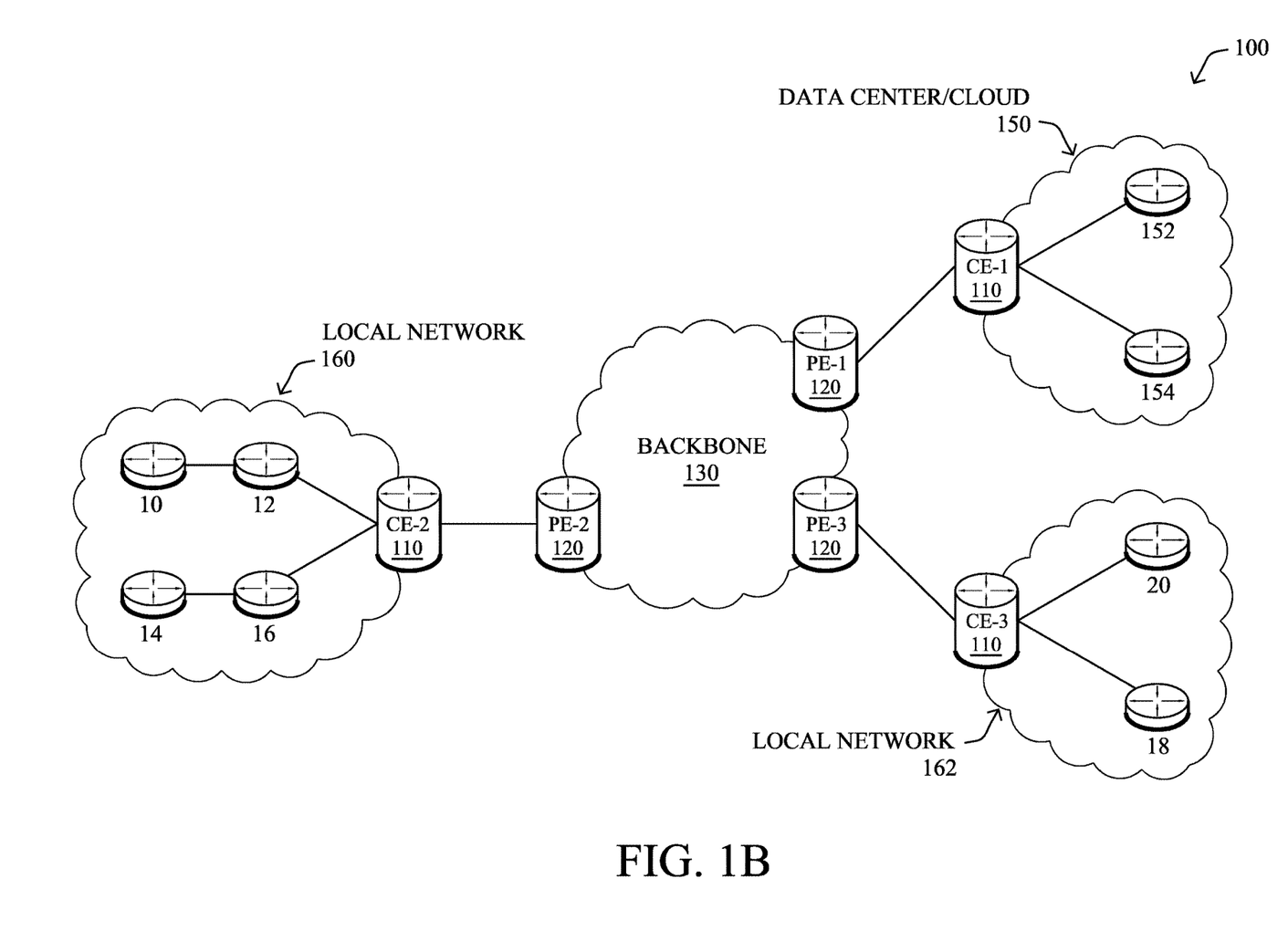

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such as the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
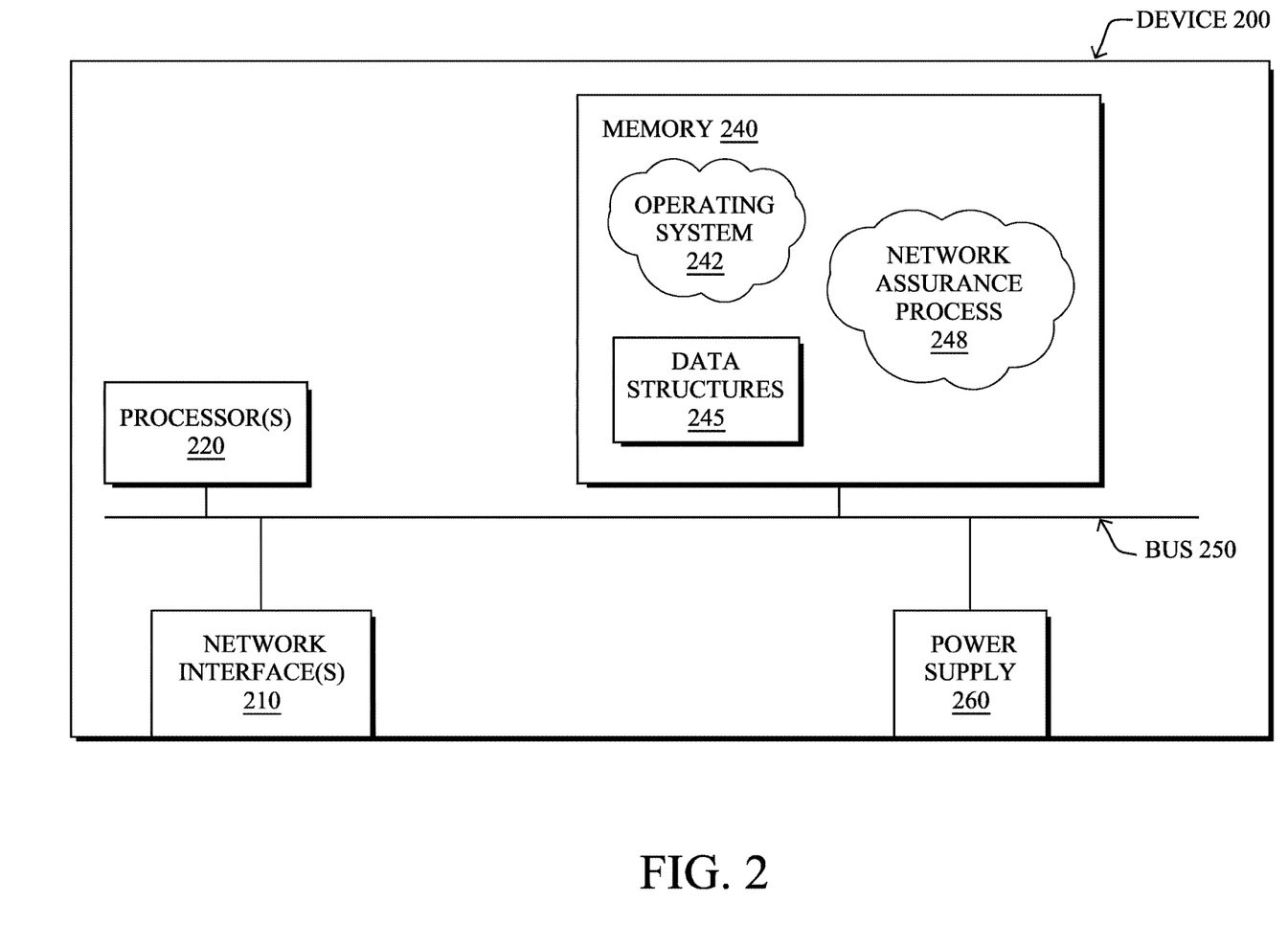
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
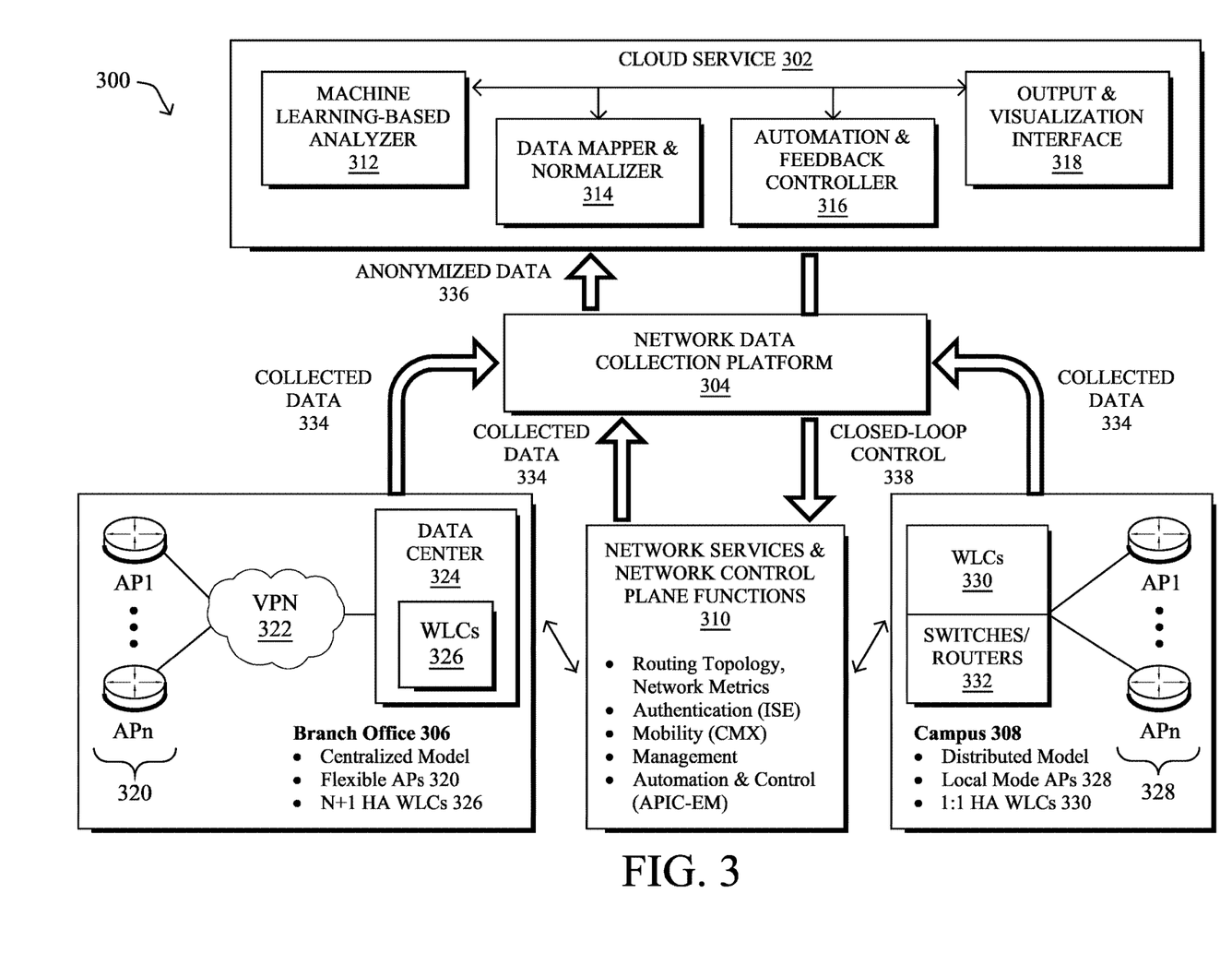
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point AP1 through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, the network assurance service introduced herein may employ any number of machine learning-based anomaly detectors to detect anomalous behaviors in a monitored network. However, anomaly detection, by itself, does not provide any actual explanation of the anomalous behavior. The precise form of such explanation can vary greatly, ranging from Natural Language Generation (NLG) used to describe the problem in plain English, to mere visual cues that indicate candidate factors that may have played a role in the problem raised by the anomaly detector. Regardless of the form, one of the most powerful types of explanation that an anomaly detection system can provide is the root cause of problem, or at least a hint at what the root cause could be.

In various embodiments, a network assurance service may leverage statistical techniques to identify the root cause of an anomaly. Such techniques, for example, may range from Bayesian methods to simple heuristics based on correlation scores. However, these approaches also require a significant amount of input from skilled Subject Matter Experts (SMEs), particularly during the design phase.

Anomaly Detection with Root Cause Learning in a Network Assurance Service

The techniques herein introduce mechanisms that provide meaningful root causes and/or explanations for anomaly detection alerts raised by a network assurance service. In some aspects, the techniques herein collect feedback regarding detected anomalies and, in turn, use the feedback to dynamically adjust and/or expand its internal knowledge base of anomaly root causes.

Specifically, according to one or more embodiments of the disclosure as described in detail below, a network assurance service that monitors a network detects an anomaly in the network by applying a machine learning-based anomaly detector to telemetry data collected from the network. The network assurance service sends first interface data to a user interface that causes the user interface to present the detected anomaly and one or more candidate root cause metrics from the telemetry data associated with the detected anomaly. The network assurance service receives feedback regarding the one or more candidate root cause metrics. The network assurance service uses a machine learning-based model to learn a root cause of the anomaly as one or more thresholds of the one or more candidate root cause metrics, based in part on the received feedback regarding the one or more candidate root cause metrics. The network assurance service sends second interface data to the user interface. The second interface data causes the user interface to present at least one of the one or more candidate root cause metrics as a candidate root cause of a subsequent detected anomaly, based on the learned one or more thresholds.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Figure 4:
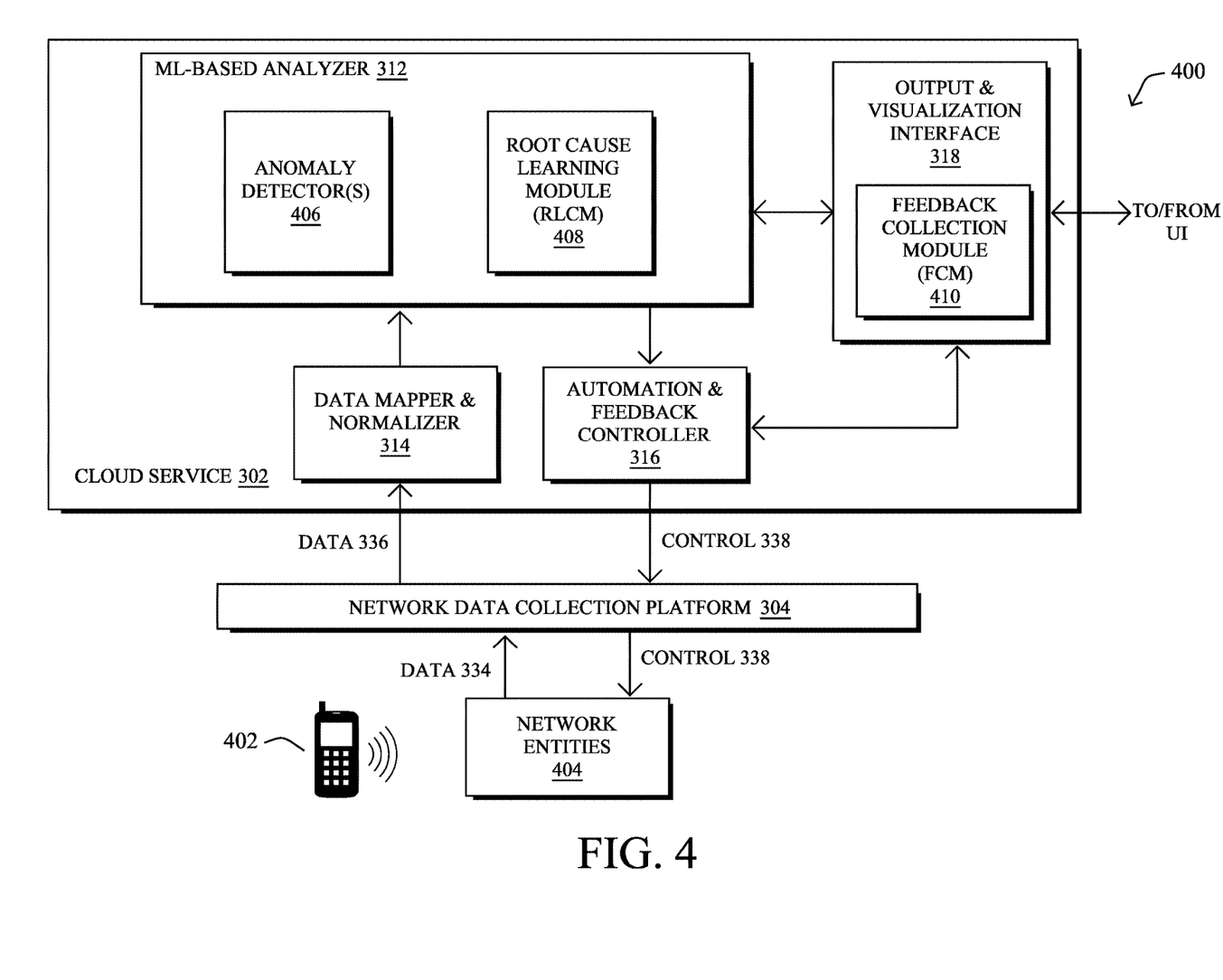
FIG. 4 illustrates an example architecture for anomaly detection with root cause learning in a network assurance system.

Operationally, FIG. 4 illustrates an example architecture 400 for dynamically adjusting prediction ranges in a network assurance system, according to various embodiments. At the core of architecture 400 may be the following components: one or more anomaly detectors 406, a root cause learning module (RCLM) 408, and/or a feedback collection module (FCM) 410. In some implementations, the components 406-410 of architecture 400 may be implemented within a network assurance system, such as system 300 shown in FIG. 3. Accordingly, the components 406-410 of architecture 400 shown may be implemented as part of cloud service 302 (e.g., as part of machine learning-based analyzer 312 and/or output and visualization interface 318), as part of network data collection platform 304, and/or on one or more network elements/entities 404 that communicate with one or more client devices 402 within the monitored network itself. Further, these components 406-410 may be implemented in a distributed manner or implemented as its own stand-alone service, either as part of the local network under observation or as a remote service. In addition, the functionalities of the components of architecture 400 may be combined, omitted, or implemented as part of other processes, as desired.

During operation, service 302 may receive telemetry data from the monitored network (e.g., anonymized data 336 and/or data 334) and, in turn, assess the data using one or more anomaly detectors 406. At the core of each anomaly detector 406 may be a corresponding anomaly detection model, such as an unsupervised learning-based model. When an anomaly detector 406 detects a network anomaly, output and visualization interface 318 may send an anomaly detection alert to a user interface (UI) for review by a subject matter expert (SME), network administrator, or other user. Notably, an anomaly detector 406 may assess any number of different network behaviors captured by the telemetry data (e.g., number of wireless onboarding failures, onboarding times, DHCP failures, etc.) and, if the observed behavior differs from the modeled behavior by a threshold amount, the anomaly detector 406 may report the anomaly to the user interface via network anomaly, output and visualization interface 318.

In order to describe the techniques herein, the following terms are introduced for illustrative purposes:

A feedback is a rating given by a given ranker (e.g., identified by a rankerId) on a given resource (e.g., an alert raised by the system, identified by a resourceId). Such ratings may be on any scale, as desired. For example, the ratings may be binary (e.g., 'like' or 'dislike'), ternary (e.g., 'like,' 'dislike,' and 'indifferent'), or the like. Additionally, these ratings can be represented numerically, in some cases. For example, '1'='like,' '−1'=dislike, '0'='indifferent,' etc.

A ranker is an end user, such as an SME, that provides one or more feedbacks on any number of resources to the network assurance service. If multiple feedbacks were provided on the same resource, only the most recent one is considered.

A resource is an element that can be rated by a ranker via a feedback. In the context of root cause analysis, resources relate to different candidate root causes proposed by the system.

According to various embodiments, architecture 400 may include feedback collection module (FCM) 410, such as part of output and visualization interface 318 or other element of architecture 400. During operation, FCM 410 is responsible for collecting feedback on different resources. In a simple embodiment, FCM 410 may include a combination of UI elements provided to the UI (e.g., a display, etc.), application programming interfaces (APIs), and/or databases that allow rankers to provide explicit feedback on the different resources. These feedbacks are typically in the form of like/dislike cues and are explicitly associated to a given root cause.

In another embodiment, FCM 410 may allow for feedback in the form of free-form text input from the UI and leverage Natural Language Understanding and Sentiment Analysis to assign similar scores to underlying root causes. Such an embodiment makes the process more natural to the user, but at the expense of a level of indirection that must be accounted for when exploiting these feedbacks.

In a further embodiment, FCM 410 may collect feedback generated by a third party application/system in charge of exploiting the root cause proposed by the system. For example, automation and feedback controller 316 or another mechanism may use root cause information for purposes of remediation (e.g., by controlling or adjusting the monitored network) and, based on its effects, provide feedback to FCM 410. For example, if the root cause of an on-boarding issue relates to a specific device causing the trouble (e.g., client 402), such a mechanism could blacklist the "bad apple." Thus, if the issue does not persist after the remediation action, the mechanism could provide an automatic feedback, thus validating the root raised by the system in the first place.

Figure 5:
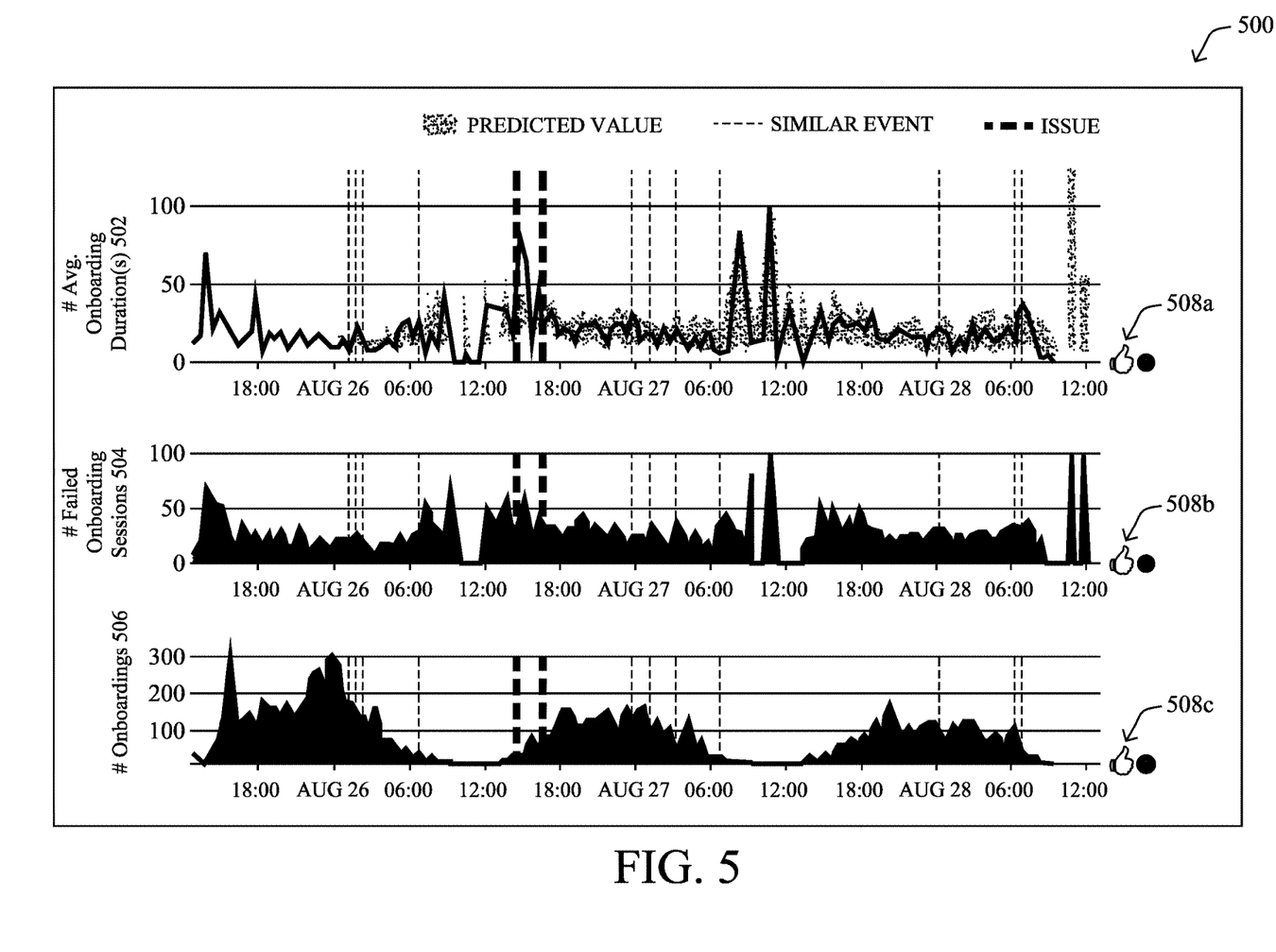
FIG. 5 illustrates an example graphical user interface (GUI) display showing detected network anomalies.

FIG. 5 illustrates an example graphical user interface (GUI) 500 showing detected network anomalies. As shown, assume that anomaly detector 406 has detected an anomaly in the network. In turn, in various embodiments, service 302 may provide GUI 500 to suggest potential root causes of the detected anomaly. For example, GUI 500 may include a plot 502 of the onboarding times taken by wireless clients in the monitored network over the course of time. In some cases, plot 502 may also indicate anomalies within the observed onboarding time, which can be detected when the observed onboarding time differs from the value predicted anomaly detection model by a threshold amount (e.g., an anomaly threshold). Also as shown, GUI 500 may also show other candidate metrics from the network that may be the root cause of the anomaly. For example, GUI 500 may also display plots 504 and 506 of the number of failed onboarding sessions and total number of onboardings, respectively, over the same time period as plot 502. On these plots, the time of occurrence of the detected issue anomaly may be highlighted, to allow the user reviewing GUI 500 to determine whether any or all of these metrics are the cause. Similar events can also be highlighted in GUI 500 across plots 502-506.

According to various embodiments, each of plots 502-506 may have an associated input 508a-508c, respectively, that allows the user of GUI 500 to provide feedback regarding the candidate root cause metrics. For example, as shown, inputs 508a-508c may allow the user of GUI 500 to specify whether the user 'likes' any of the shown metrics as root cause(s) of the detected network anomaly. This allows the network assurance service to capture feedback regarding the candidate root causes (e.g., whether the user deems the corresponding metric to be a root cause), as well as the thresholds represented in the respective plots.

Referring again to FIG. 4, another potential component of architecture 400 is the root cause learning module (RCLM) 408. In various embodiments, RCLM 408 exploits the output of FCM 410, in order to learn what would be a good root cause for the detected anomaly. In other words, RCLM 408 may predict the root cause(s) that are most likely to receive positive feedback from one or more users, when presented via the UI. To do so, RCLM 408 may use a machine learning-based approach to learn which network metrics, as well as their corresponding values/thresholds, are most likely to receive the most positive feedback when presented as suggested/candidate root causes.

In a first embodiment, RCLM 408 may employ a static knowledge base that represents all possible root causes for all possible alerts/anomalies detected by anomaly detector(s) 406. In such cases, the learning problem then becomes a recommendation problem, whereby root causes are assigned to alerts based on the preference of users. This means that a take on collaborative filtering (CF) schemes can be employed by RCLM 408. Indeed, the learning problem can be cast such that the input matrix has one row for each type of alert (e.g., representing the users in a typical CF scheme) and one column for each candidate root cause (e.g., representing the products in a typical CF scheme). In turn, the matrix may be populated with aggregate scores from all rankers, to determine the best root cause.

In another embodiment, RCLM 408 may instead maintain a dynamic knowledge base that can be augmented with new root causes. Assuming that root causes take the form of a given metric that enters a given regime and/or passes a given threshold, such that any triplet (metric, transform, threshold) represent a candidate root cause. For instance, one root cause related to the increase in network traffic may be specified as (traffic, derivative, 2.0), signifying that the root cause may correspond to times when the traffic metric sees its derivative going above 2.0. According to various embodiments, to learn such rules, RCLM 408 may set up a binary classification problem on the feedback database, whereby tree-based classifiers would be trained to predict whether a given root cause is going to be liked or disliked. The input features of the classifier would be the value of the metric of interest for different candidate transforms at the time of the alarm across many occurrences. The classifier would then quickly learn the combination of transforms and cutoff values that lead to more positive feedback.

Figure 6:
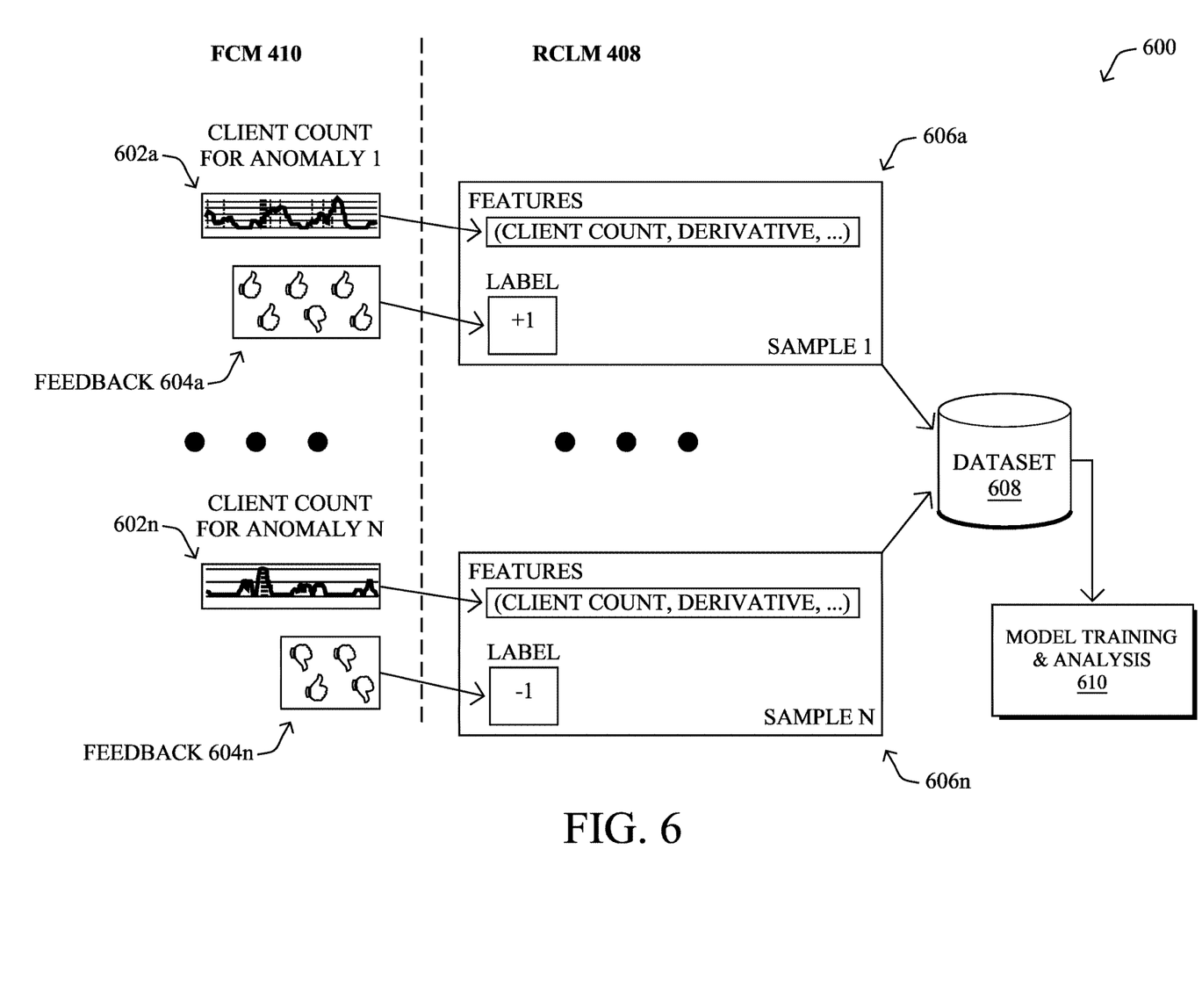
FIG. 6 illustrates an example of root cause learning of detected anomalies.

FIG. 6 illustrates an example 600 of the interactions of FCM 410 and RCLM 408, in some embodiments. As shown, FCM 410 may collect feedback 604 regarding a candidate root cause metric 602 for an anomaly from any number of users. For example, assume that the client count metric is presented as a candidate root cause for a detected network anomaly. In turn, any number of users may rate this suggestion as 'like' or 'dislike.' Such a process may be repeated by FCM 410 for any number of anomalies of the detected type (e.g., a first through $n^{th}$ anomaly). Accordingly, FCM 410 may receive feedback 604a regarding candidate metric 602a for a first detected anomaly and repeat this process any number of times until receiving feedback 604n regarding candidate metric 602n.

As would be appreciated, the values of the candidate metrics 602 presented to the users as candidate root causes may change over time, leading to different sets of corresponding feedback 604. For each such pairing, RCLM 410 may construct a corresponding sample 606 that captures the features of the candidate metric, such as its type (e.g., client count), computational transformations (e.g., derivative), and the like. In addition, based on the feedback 604 for the particular metric 602, RCLM 410 may label the resulting sample as an aggregate of this feedback. For example, as shown, as most of feedback 604a is positive (e.g., metric 602a is considered relevant), RCLM 410 may label sample 606a as '+1' to represent 'like' or 'relevant.' Conversely, as most of feedback 604n is negative, RCLM 410 may label the resulting sample 606n as '−1' to indicate that the users overall did not think that metric 602n was relevant (e.g., that metric 602n was not the root cause of the anomaly).

By storing the resulting samples 606 in a dataset/database 608, RCLM 410 can then use this captured information as training data for its machine learning model and perform model training and analysis on it (box 610). In other words, the labeled samples in dataset 608 can be used to train a classifier that takes a given metric observation as input and classify/predict whether the pool of users will deem the metric as a potential cause of a detected anomaly.

In various embodiments, RCLM 408 may train a decision tree-based model to identify which transformations and/or metric thresholds would optimize the user feedback. There are a number of ways in which RCM 408 may do so. In one embodiment, RCM 408 may train a random forest classifier of depth-1 trees, obtaining in this way an ensemble of so called stump classifiers, each of which is a simple decision rule, a threshold applied to one feature dimension. Once the ensemble is trained, all individual stumps can be used to select the best feature to pick (e.g. by a majority vote approach, another aggregation strategy, etc.), while the precise optimal threshold for the metric can be determined by aggregating all of the thresholds presented to the users for which feedback was received. In another embodiment it may be possible for RCM 408 to to train a tree-based model without restricting the depth in any way, by performing the selection of the best feature based on the feature importance. The optimal cutoff can then be learned by RCM 408 based on the distribution of the labeled samples along the selected feature dimension (e.g., by finding the value that best separates positive and negative samples).

Figure 7:
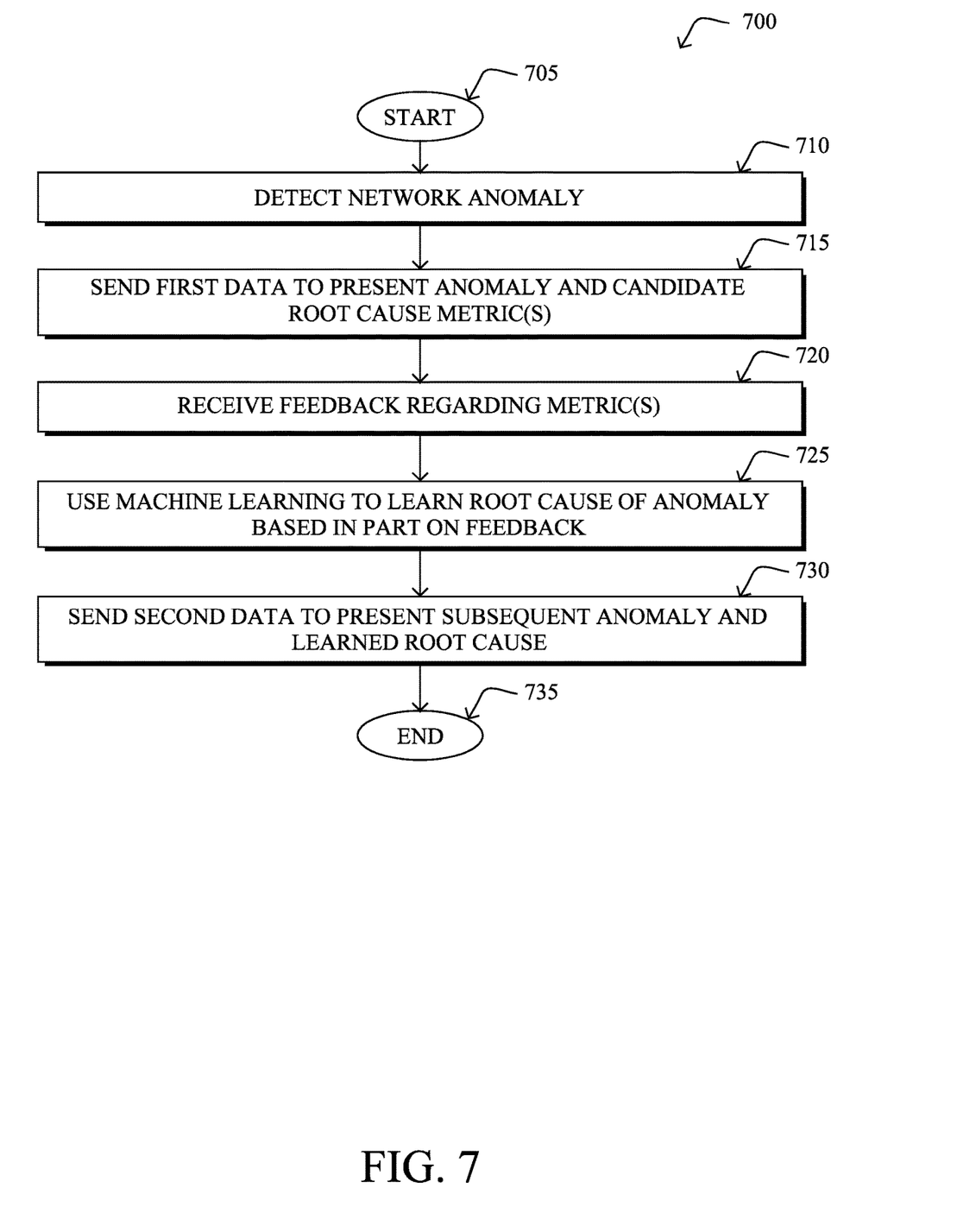
FIG. 7 illustrates an example simplified procedure for performing anomaly detection with root cause learning in a network assurance service.

FIG. 7 illustrates an example simplified procedure for performing anomaly detection with root cause learning in a network assurance service. For example, a non-generic, specifically configured device (e.g., device 200) may perform procedure 700 by executing stored instructions (e.g., process 248), to provide a network assurance service that monitors one or more networks. The procedure 400 may start at step 705, and continues to step 710, where, as described in greater detail above, the network assurance service may detect an anomaly in the network by applying a machine learning-based anomaly detector to telemetry data collected from the network. For example, such an anomaly detector may include an unsupervised learning-based model that determines whether one or more observations of the network statistically differ from the modeled behavior of the network by a certain amount.

At step 715, as detailed above, the network assurance service may send first interface data to a user interface that causes the user interface to present the detected anomaly and one or more candidate root cause metrics from the telemetry data associated with the detected anomaly. Such a metric may be any form of information captured by the telemetry data from the monitored network and can, in some cases, include other information derived therefrom (e.g., averages, etc.). In many cases, the interface data may be in the form of display data that shows time series of the candidate metrics over a given time window associated with the anomaly. For example, assume that the detected anomaly represents an abnormal number of wireless client onboarding failures. In such a case, the one or more candidate root cause metrics may include one or more of: a DHCP error count, the number of clients being onboarded to the network at any given time, or a number of Authentication, Authorization and Accounting (AAA) authentication failures.

At step 720, the network assurance service may receive feedback regarding the one or more candidate root cause metrics, as described in greater detail above. In general, such feedback may capture the sentiment of the user operating the user interface regarding the metric(s) presented to the user as candidate root causes of the detected anomaly. This feedback may be binary (e.g., 'like' or 'dislike') or may be on a larger scale that captures further sentiments (e.g., 'indifferent, etc.). Such a feedback mechanism may capture the sentiments of any number of users regarding the detected anomaly.

At step 725, as detailed above, the network assurance service may use a machine learning-based model to learn a root cause of the anomaly as one or more thresholds of the one or more candidate root cause metrics, based in part on the received feedback regarding the one or more candidate root cause metrics. In various embodiments, the machine learning-based model may be a random forest classifier trained to label one or more thresholds of the one or more metrics as either likely to be deemed via feedback from the user interface as a root cause of the anomaly or likely to not be deemed a root cause of the anomaly. For example, the service may use the classifier to compute one or more thresholds as an average of thresholds labeled by the stump classifiers as likely to be deemed the root cause of the anomaly. In other words, given the set of metrics presented to the users and their feedback, the machine learning-based classifier may classify an input metric and threshold as either likely to be rated by users as the root cause of an anomaly or not. In doing so, the candidate set of metric(s) and threshold(s) that is most likely to be rated as the root cause can be selected as the optimal root cause. In some embodiments, the result of this learning may be a new root cause that the service can then add to a root cause database maintained by the service.

At step 730, the network assurance service may send second interface data to the user interface, as described in greater detail above. The second interface data may cause the user interface to present at least one of the one or more candidate root cause metrics as a candidate root cause of a subsequent detected anomaly, based on the learned one or more thresholds. In other words, by using feedback over time to learn the most likely root causes of a network anomaly, the learned set of root cause metric(s) and/or thresholds can be suggested by the service as the root cause of a subsequent anomaly that has similar characteristics as the anomaly detected in step 710. Procedure 700 then ends at step 735.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for a root cause analysis mechanism for a network assurance service that uses feedback to dynamically learn the root causes of network anomalies detected by the service.

While there have been shown and described illustrative embodiments that provide for anomaly detection with root cause learning in a network assurance service, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   detecting, by a network assurance service that monitors a network, an anomaly in the network by applying a machine learning-based anomaly detector to telemetry data collected from the network;
   sending, by the network assurance service, first interface data to a user interface, wherein the first interface data causes the user interface to present the detected anomaly and one or more candidate root cause metrics from the telemetry data associated with the detected anomaly, wherein the one or more candidate root cause metrics comprise at least one of: a Dynamic Host Configuration Protocol (DHCP) error count, a number of clients being onboarded to the network, or a number of Authentication, Authorization and Accounting (AAA) authentication failures;

receiving, at the network assurance service, feedback from the user interface regarding the one or more candidate root cause metrics from the telemetry data associated with the detected anomaly, wherein the feedback received from the user interface indicates whether or not a user deems the one or more candidate root cause metrics as a root cause of the anomaly;

using, by the network assurance service and based in part on the received feedback regarding the one or more candidate root cause metrics, a machine learning-based model to learn a root cause of the anomaly, wherein the root cause of the anomaly comprises a threshold and one candidate root cause metric of the one or more candidate root cause metrics that corresponds to the threshold;

sending, by the network assurance service, second interface data to the user interface, wherein the second interface data causes the user interface to present at least one of the one or more candidate root cause metrics as a candidate root cause of a subsequent detected anomaly, based on the one or more thresholds; and adding, by the network assurance service, the root cause of the anomaly comprising the one or more thresholds as a new root cause to a root cause database maintained by the network assurance service.

2. The method as in claim 1, wherein the feedback received from the user interface comprises a binary label that labels the one or more thresholds of the one or more candidate metrics as the likely root cause of the anomaly or not likely to be the root cause of the anomaly.

3. The method as in claim 1, wherein at least one of the candidate root cause metrics comprises a computational transformation of the telemetry data.

4. An apparatus, comprising:
one or more network interfaces to communicate with a network;
a processor coupled to the network interfaces and configured to execute one or more processes; and
a memory configured to store a process executable by the processor, the process when executed configured to:
detect an anomaly in the network by applying a machine learning-based anomaly detector to telemetry data collected from the network;
send first interface data to a user interface, wherein the first interface data causes the user interface to present the detected anomaly and one or more candidate root cause metrics from the telemetry data associated with the detected anomaly, wherein the one or more candidate root cause metrics comprise at least one of: a Dynamic Host Configuration Protocol (DHCP) error count, a number of clients being onboarded to the network, or a number of Authentication, Authorization and Accounting (AAA) authentication failures;
receive feedback from the user interface regarding the one or more candidate root cause metrics from the telemetry data associated with the detected anomaly, wherein the feedback received from the user interface indicates whether or not a user deems the one or more candidate root cause metrics as a root cause of the anomaly;
use, based in part on the received feedback regarding the one or more candidate root cause metrics, a machine learning-based model to learn a root cause of the anomaly, wherein the root cause of the anomaly comprises a threshold and one candidate root cause metric of the one or more candidate root cause metrics that corresponds to the threshold;
send second interface data to the user interface, wherein the second interface data causes the user interface to present at least one of the one or more candidate root cause metrics as a candidate root cause of a subsequent detected anomaly, based on the one or more thresholds; and
add the root cause of the anomaly comprising the one or more thresholds as a new root cause to a root cause database maintained by the network assurance service.

5. The apparatus as in claim 4, wherein the feedback received from the user interface comprises a binary label that labels the one or more thresholds of the one or more candidate metrics as the likely root cause of the anomaly or not likely to be the root cause of the anomaly.

6. The apparatus as in claim 4, wherein at least one of the candidate root cause metrics comprises a computational transformation of the telemetry data.

7. A tangible, non-transitory, computer-readable medium storing program instructions that cause a network assurance service that monitors a network to execute a process comprising:
detecting, by the network assurance service, an anomaly in the network by applying a machine learning-based anomaly detector to telemetry data collected from the network;
sending, by the network assurance service, first interface data to a user interface, wherein the first interface data causes the user interface to present the detected anomaly and one or more candidate root cause metrics from the telemetry data associated with the detected anomaly, wherein the one or more candidate root cause metrics comprise at least one of: a Dynamic Host Configuration Protocol (DHCP) error count, a number of clients being onboarded to the network, or a number of Authentication, Authorization and Accounting (AAA) authentication failures;
receiving, at the network assurance service, feedback from the user interface regarding the one or more candidate root cause metrics from the telemetry data associated with the detected anomaly, wherein the feedback received from the user interface indicates whether or not a user deems the one or more candidate root cause metrics as a root cause of the anomaly;
using, by the network assurance service and based in part on the received feedback regarding the one or more candidate root cause metrics, a machine learning-based model to learn a root cause of the anomaly, wherein the root cause of the anomaly comprises a threshold and one candidate root cause metric of the one or more candidate root cause metrics that corresponds to the threshold;
sending, by the network assurance service, second interface data to the user interface, wherein the second interface data causes the user interface to present at least one of the one or more candidate root cause metrics as a candidate root cause of a subsequent detected anomaly, based on the one or more thresholds; and adding, by the network assurance service, the root cause of the anomaly comprising the one or more thresholds as a new root cause to a root cause database maintained by the network assurance service.

\* \* \* \* \*